(12) United States Patent
Berezhnyy

(10) Patent No.: US 11,892,389 B2
(45) Date of Patent: Feb. 6, 2024

(54) FLOW CYTOMETER INCLUDING LIGHT COLLECTION MODULES, AND METHODS OF USING THE SAME

(71) Applicant: Becton, Dickinson and Company, Franklin Lakes, NJ (US)

(72) Inventor: Ihor V. Berezhnyy, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 162 days.

(21) Appl. No.: 17/511,146

(22) Filed: Oct. 26, 2021

(65) Prior Publication Data

US 2022/0155210 A1    May 19, 2022

Related U.S. Application Data

(60) Provisional application No. 63/114,230, filed on Nov. 16, 2020.

(51) Int. Cl.
*G01N 15/14* (2006.01)
*G01N 15/10* (2006.01)

(52) U.S. Cl.
CPC . *G01N 15/1436* (2013.01); *G01N 2015/1006* (2013.01); *G01N 2015/149* (2013.01); *G01N 2015/1452* (2013.01)

(58) Field of Classification Search
CPC ....... G01N 15/1459; G01N 2015/1006; G01N 15/1434; G01N 2015/149; G01N 15/14; G01N 21/6486; G01N 21/6428; G01N 15/147; G01N 15/1436; G01N 15/1404; G01N 21/6458; G01N 15/1484;
(Continued)

(56) References Cited

U.S. PATENT DOCUMENTS

| | | | |
|---|---|---|---|
| 2010/0220315 A1* | 9/2010 | Morrell | G01N 15/1436 356/73 |
| 2014/0353522 A1* | 12/2014 | Wu | G01N 15/1434 250/458.1 |

(Continued)

FOREIGN PATENT DOCUMENTS

| | | | | |
|---|---|---|---|---|
| EP | 1859239 B1 | 9/2017 | | |
| HU | 227875 B1 * | 5/2012 | ......... | G01N 15/1404 |
| WO | WO-2013181453 A2 * | 12/2013 | .......... | F04B 11/0025 |
| WO | WO-2015084676 A1 * | 6/2015 | .......... | F04B 11/0025 |
| WO | WO-2017046806 A1 * | 3/2017 | ............... | G01B 9/04 |
| WO | WO/2018022674 A1 | 2/2018 | | |

*Primary Examiner* — Michael P Stafira
(74) *Attorney, Agent, or Firm* — Peter W. Schroen; Bret E. Field; BOZICEVIC, FIELD & FRANCIS LLP

(57) ABSTRACT

Flow cytometers including light collection modules are provided. In embodiments, the subject flow cytometers include a light source for irradiating a particle passing through a flow cell at an interrogation point, an objective lens for focusing particle-modulated light, and a light collection module for collecting objective lens focused light. In some embodiments, the light collection module includes a fiber optic light conveyor and a refractive optical element positioned between the objective lens and the fiber optic light conveyor. In such embodiments, the refractive optical element is configured to direct the objective lens focused light onto the surface of the fiber optic light conveyor by refracting the objective lens focused light such that it propagates along a single optical axis. Methods for using the flow cytometers are also provided.

20 Claims, 12 Drawing Sheets

Prism provides additional optical power to couple light into fiber

(58) Field of Classification Search

CPC ......... G01N 2015/144; G01N 15/1429; G01N 15/1475; G01N 2015/1493; G01N 21/645; G01N 2021/6439; G01N 2015/1409; G01N 2015/1497; G01N 33/582; G01N 2015/1452; G01N 2015/0065; G01N 2201/061; G01N 33/487; G01N 15/1425; G01N 15/1463; G01N 15/0205; G01N 2015/0038; G01N 2201/12; G01N 2015/1486; G01N 2015/1081; G01N 21/05; G01N 2333/70596; G01N 15/0227; G01N 15/1012; G01N 2015/1413; G01N 2015/1447; G01N 21/0303; G01N 2015/1025; G01N 2021/6421; G01N 33/585; G01N 15/05; G01N 2015/0053; G01N 2015/0288; G01N 33/4915; G01N 15/04; G01N 15/0656; G01N 33/5005; G01N 2015/1018; G01N 33/5091; G01N 2015/1438; G01N 21/27; G01N 30/0005; G01N 15/042; G01N 15/0631; G01N 15/1468; G01N 2015/0233; G01N 2015/035; G01N 2015/045; G01N 2015/1075; G01N 2021/6482; G01N 21/01; G01N 2458/00; G01N 27/447; G01N 27/44756; G01N 33/4833; G01N 33/491; G01N 1/30; G01N 2015/145; G01N 1/44; G01N 21/17; G01N 2201/06113; G01N 33/49; G01N 21/47; G01N 33/566; G01N 33/56972; G01N 2021/1738; G01N 2333/70589; G01N 33/54313; G01N 33/56966; G01N 21/49; G01N 21/648; G01N 2015/008; G01N 2015/1411; G01N 21/53; G01N 21/64; G01N 33/5308; G01N 33/54366; G01N 15/02; G01N 33/53; G01N 2015/0084; G01N 21/6456; G01N 33/574; G01N 15/1427; G01N 35/1095; G01N 2015/0073; G01N 2015/1443; G01N 2015/1454; G01N 2021/6419; G01N 21/63; G01N 21/6408; G01N 2800/52; G01N 33/5061; G01N 2015/1477; G01N 21/25; G01N 33/57492; G01N 2015/0088; G01N 2015/1402; G01N 2015/1415; G01N 33/57484; G01N 1/40; G01N 2001/4038; G01N 2201/0633; G01N 27/44721; G01N 27/4473; G01N 27/44773; G01N 27/44791; G01N 27/44795; G01N 30/00; G01N 30/7266; G01N 33/48; G01N 33/561; G01N 33/6848; G01N 33/6851; G01N 15/1456; G01N 21/6402; G01N 33/558; G01N 2015/1406; G01N 2015/1445; G01N 2021/6432; G01N 33/577; G01N 33/68; G01N 35/00069; G01N 2015/1465; G01N 2333/70517; G01N 2333/70546; G01N 33/5008; G01N 33/5029; G01N 33/5055; G01N 33/5064; G01N 33/92; G01N 15/06; G01N 2015/055; G01N 2021/6471; G01N 2030/8813; G01N 2201/10; G01N 2201/129; G01N 1/38; G01N 15/00; G01N 2001/2826; G01N 2001/4027; G01N 2021/6463; G01N 2035/00306; G01N 21/4788; G01N 21/85; G01N 33/531; G01N 33/54353; G01N 33/54373; G01N 33/553; G01N 33/56988; G01N 33/5767; G01N 35/1097; G01N 2015/0238; G01N 2015/0294; G01N 2021/0307; G01N 2021/1787; G01N 2021/6478; G01N 21/359; G01N 21/55; G01N 2201/068; G01N 2201/1045; G01N 2496/05; G01N 33/5302; G01N 33/532; G01N 33/58; G01N 15/0211; G01N 15/0612; G01N 15/0618; G01N 2015/0092; G01N 2015/0681; G01N 2015/0693; G01N 2021/4707; G01N 2021/4716; G01N 2021/6469; G01N 2035/00237; G01N 2035/00356; G01N 2035/00881; G01N 2035/1034; G01N 21/4785; G01N 21/4795; G01N 21/51; G01N 2333/575; G01N 2500/10; G01N 2510/00; G01N 2800/042; G01N 33/1886; G01N 33/50; G01N 33/5011; G01N 33/5014; G01N 33/5304; G01N 33/569; G01N 33/6803; G01N 33/74; G01N 35/00; G01N 35/00871; G01N 35/0098; G01N 15/10; G01N 2015/025; G01N 2015/1422; G01N 2015/1461; G01N 2015/1472; G01N 2015/1488; G01N 2015/1495; G01N 2021/0346; G01N 2021/177; G01N 2021/6417; G01N 2021/6423; G01N 2021/6441; G01N 2035/00326; G01N 2035/1032; G01N 2035/1051; G01N 21/553; G01N 21/554; G01N 2201/08; G01N 2333/705; G01N 2500/04; G01N 27/62; G01N 33/5032; G01N 33/57423; G01N 33/57446; G01N 33/57449; G01N 35/1065; G01N 1/00; G01N 1/36; G01N 15/1431; G01N 2015/0046; G01N 2015/142; G01N 2021/635; G01N 2021/6491; G01N 21/255; G01N 21/59; G01N 21/65; G01N 21/94; G01N 2201/0218; G01N 2201/062; G01N 2201/0813; G01N 2201/104; G01N 2201/112; G01N 2223/612; G01N 2333/47; G01N 2333/7051; G01N 2333/70514; G01N 2800/24; G01N 2800/324; G01N 2800/325; G01N 2800/50; G01N 2800/7095; G01N 33/483; G01N 33/52; G01N 33/542; G01N 33/54346; G01N 33/5735; G01N 33/57407; G01N 33/57434; G01N 33/57438; G01N 33/57496; G01N 33/6845; G01N 33/6887; G01N 33/6893; G01N 33/6896; G01N 33/84; G01N 35/00029; G01N 35/0099

See application file for complete search history.

(56) References Cited

U.S. PATENT DOCUMENTS

| | | | |
|---|---|---|---|
| 2015/0115174 A1* | 4/2015 | Chen | G01N 35/1095 250/216 |
| 2016/0258859 A1 | 9/2016 | Van Den Engh et al. | |
| 2016/0370280 A1* | 12/2016 | Yamamoto | G01N 15/1427 |
| 2018/0038784 A1* | 2/2018 | Marks | G01N 15/1434 |

* cited by examiner

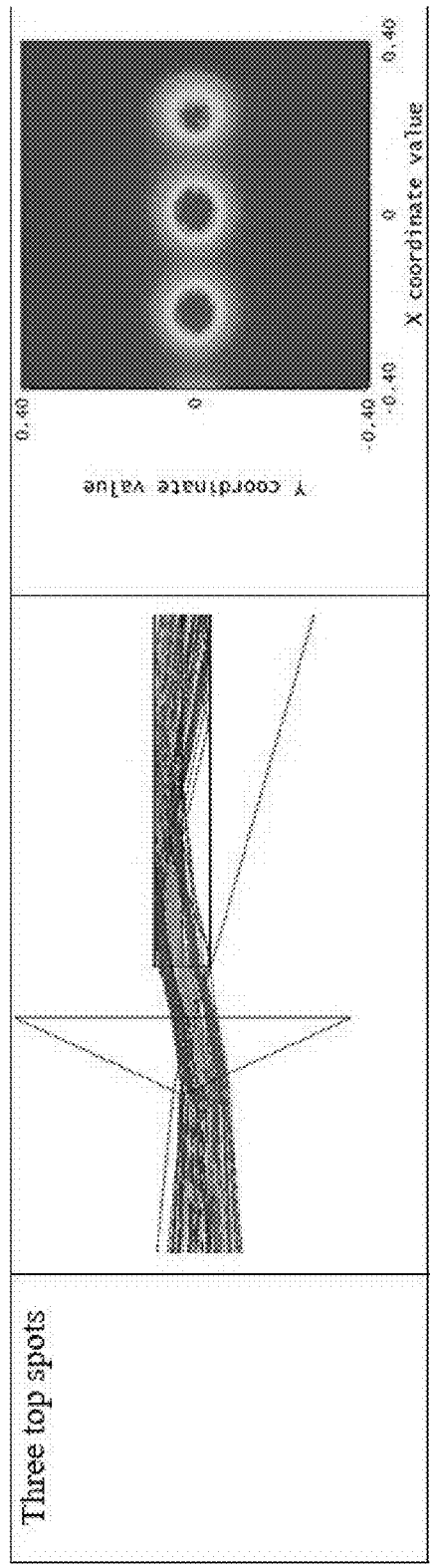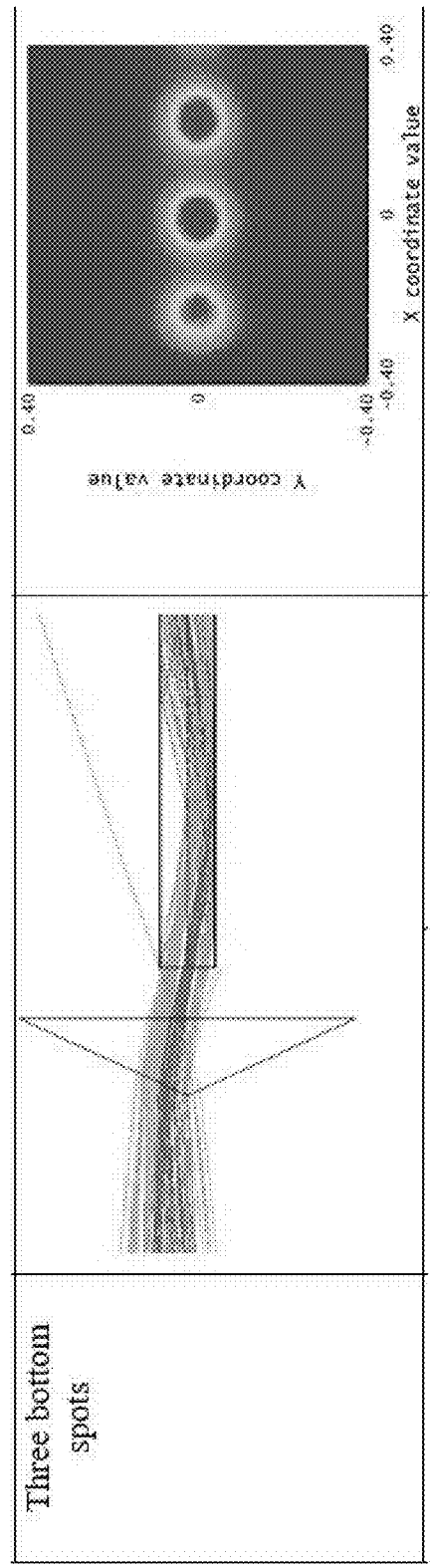

FLOW CYTOMETER INCLUDING LIGHT COLLECTION MODULES, AND METHODS OF USING THE SAME

CROSS-REFERENCE TO RELATED APPLICATION

Pursuant to 35 U.S.C. § 119 (e), this application claims priority to the filing dates of U.S. Provisional Patent Application Ser. No. 63/114,230 filed Nov. 16, 2020, the disclosure of which application is incorporated herein by reference in their entirety.

INTRODUCTION

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation.

In typical flow cytometric systems possessing multiple lasers, a final focal lens (FFL) generates an elliptical light spot having a height ranging from 10-20 μm for each of the lasers in the flow cytometer. After the sample is irradiated, an objective lens collects laser spot light and projects it on a set (i.e., more than one) of optical fibers. Conventionally, each laser spot is projected onto a respective optical fiber, i.e., one fiber per laser spot. The optical fibers subsequently convey the light from the laser spots to detectors. For example, FIG. 1 depicts a conventional flow cytometric system including a fiber set. Particles passing through a flow cell (i.e., cuvette 101) are irradiated with a light source including multiple lasers (not shown). Laser spots emitted from the flow cell are collected by an objective lens 102, and are projected onto a set of optical fibers 103 for conveying the laser spots to a set of detectors. Similarly, FIG. 2 depicts a simulation of light collected by a conventional flow cytometer including a fiber set. As shown in FIG. 2, light from laser focus spots 201 is collected by the objective lens 202. Light from each of the laser spots is projected on a respective optical fiber in the fiber set 203.

SUMMARY

Flow cytometric systems including fiber sets, such as described above and illustrated in FIGS. 1 and 2, contribute to increases in complexity, size, weight, power consumption and cost of the flow cytometer. A solution for decreasing flow cytometer complexity is consequently desirable.

Flow cytometers including light collection modules are provided, where the light collection modules include a fiber optic light conveyor and a refractive optical element positioned between an objective lens and a fiber optic light conveyor. The refractive optical element is configured to direct the objective lens focused light onto the surface of the fiber optic light conveyor by refracting the objective lens focused light such that it propagates along a single optical axis. Also provided are methods of using the flow cytometers.

Aspects of the invention include flow cytometers having a light source for irradiating a particle passing through a flow cell at an interrogation point, an objective lens for focusing particle-modulated light, and a light collection module for collecting objective lens focused light. In some embodiments, the light collection module includes a fiber optic light conveyor and a refractive optical element positioned between the objective lens and the fiber optic light conveyor. In certain instances, the refractive optical element is configured to direct the objective lens focused light onto the surface of the fiber optic light conveyor by refracting the objective lens focused light such that it propagates along a single optical axis. In some instances, the refractive optical element is a prism. In other instances, the refractive optical element is a cylindrical lens. In embodiments, the particle-modulated light collected by the subject light collection module is forward scattered light. In additional embodiments, the particle modulated light collected by the subject light collection module is side scattered light. In still additional embodiments, the particle-modulated light collected by the subject light collection module is fluorescent light. In certain embodiments, the light collection module collects both scattered (e.g., forward scattered and/or side scattered light) and fluorescent light. In some embodiments, the subject light source includes multiple lasers configured to irradiate the flow cell and generate focal spots therein. In certain embodiments, the distance between the focal spots is not less than the particle size. In embodiments, the fiber optic light conveyor is operably coupled to a detector assembly. In certain embodiments, the detector assembly includes a forward scattered light detector, a side scattered light detector and/or a fluorescent light detector.

Aspects of the invention also include a method of analyzing a sample including introducing the sample into a flow cytometer having a light source for irradiating a particle passing through a flow cell at an interrogation point, an objective lens for focusing particle-modulated light, and a light collection module for collecting objective lens focused light. In some embodiments, the light collection module includes a fiber optic light conveyor and a refractive optical element positioned between the objective lens and the fiber optic light conveyor. In certain instances, the refractive optical element is configured to direct the objective lens focused light onto the surface of the fiber optic light conveyor by refracting the objective lens focused light such that it propagates along a single optical axis. In some instances, the refractive optical element is a prism. In other instances, the refractive optical element is a cylindrical lens. In embodiments, the particle-modulated light collected by the subject light collection module is forward scattered light. In additional embodiments, the particle modulated light collected by the subject light collection module is side scattered light. In still additional embodiments, the particle-modulated light collected by the subject light collection module is fluorescent light. In certain embodiments, the light collection module collects both scattered (e.g., forward scattered and/or side scattered light) and fluorescent light. In some embodiments, the subject light source includes multiple lasers configured to irradiate the flow cell and generate focal spots therein. In certain embodiments, the distance between the focal spots is not less than the particle size. In embodiments, the fiber optic light conveyor is operably coupled to a detector assembly. In certain embodiments, the detector assembly includes a forward scattered light detector, a side scattered light detector and/or a fluorescent light detector.

BRIEF DESCRIPTION OF THE FIGURES

The invention may be best understood from the following detailed description when read in conjunction with the accompanying drawings. Included in the drawings are the following figures:

FIGS. 7A-C each depict a simulation of collecting light from laser focal spots with a flow cytometric system including a light collection module according to certain embodiments.

DETAILED DESCRIPTION

Figure 1:
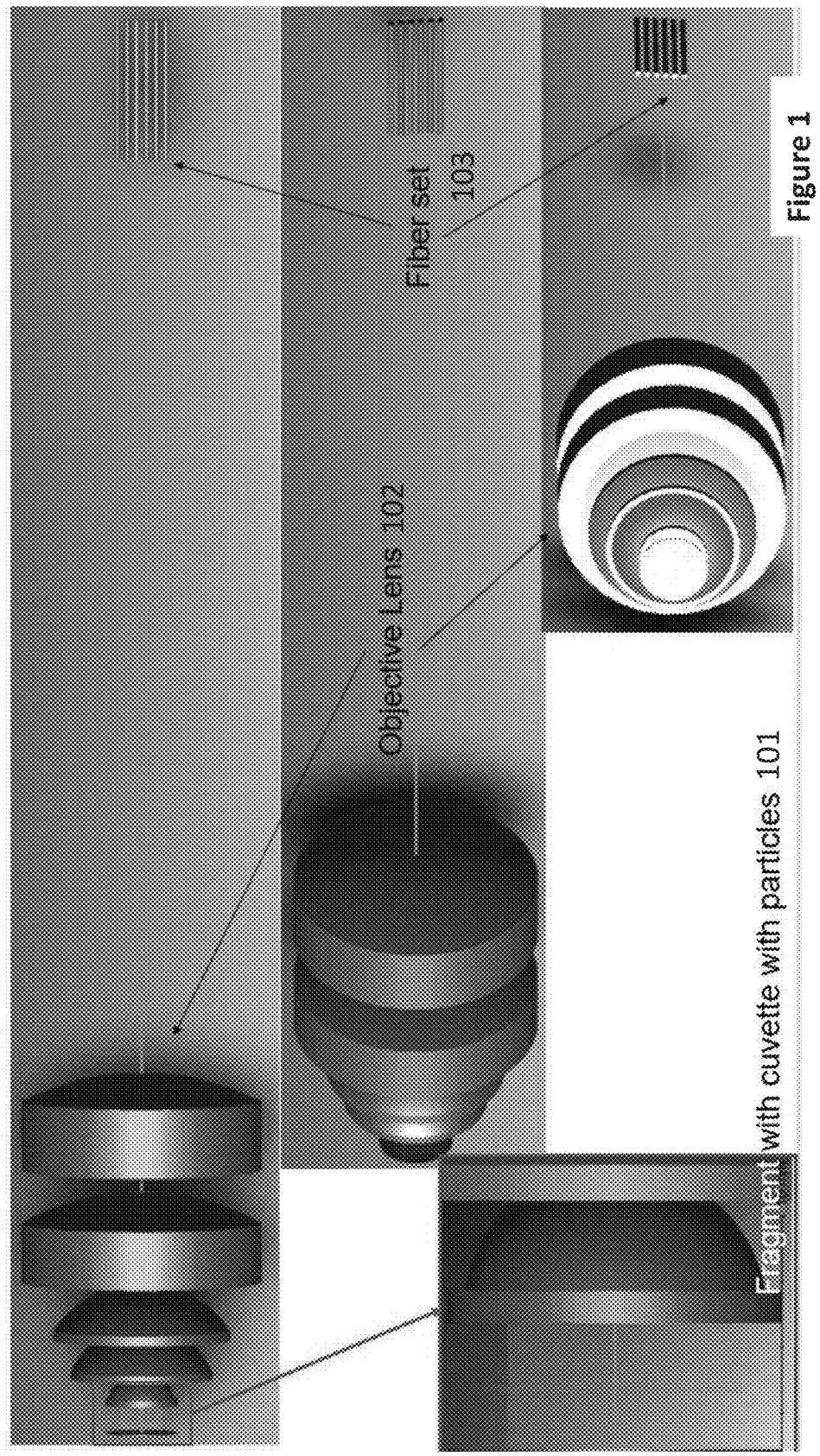
FIG. 1 depicts a conventional flow cytometric system including a fiber set.
Figure 2:
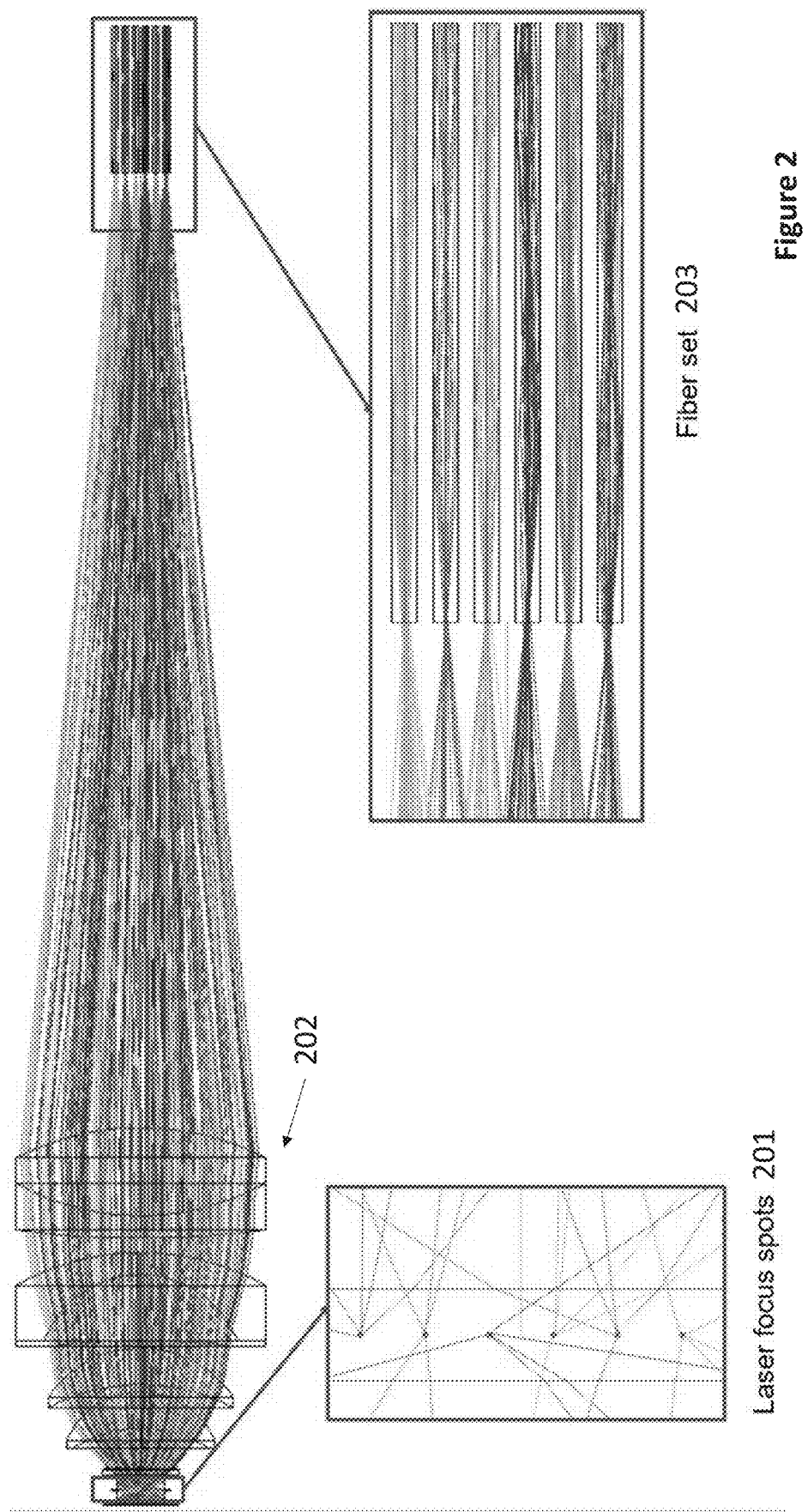
FIG. 2 depicts a simulation of light collected by a conventional flow cytometric system including a fiber set.

Flow cytometers including light collection modules are provided. In embodiments, the subject flow cytometers include a light source for irradiating a particle passing through a flow cell at an interrogation point, an objective lens for focusing particle-modulated light, and a light collection module for collecting objective lens focused light. In some embodiments, the light collection module includes a fiber optic light conveyor and a refractive optical element positioned between the objective lens and the fiber optic light conveyor. In such embodiments, the refractive optical element is configured to direct the objective lens focused light onto the surface of the fiber optic light conveyor by refracting the objective lens focused light such that it propagates along a single optical axis. Methods for using the flow cytometers are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Flow Cytometers Including Light Collection Modules

As discussed above, aspects of the invention are directed to flow cytometers including a light source for irradiating a particle passing through a flow cell at an interrogation point, an objective lens for focusing particle-modulated light, and a light collection module for collecting objective lens focused light. By "collecting" objective lens focused light, it is meant gathering light modulated by the particles in the flow cell following the irradiation thereof so that the light can be conveyed to a set of detectors for detection. In some instances, the particle modulated light is forward scattered light. By "forward scattered" light, it is meant light that travels through or around the particle in a mostly forward direction. The intensity of forward scattered light is generally dependent on the overall size of the particle. In additional instances, the particle-modulated light is side scattered light. By "side scattered" light, it is meant light that is refracted and reflected from the surfaces and internal structures of the particle. In still additional instances, the particle-modulated light is fluorescent light. By "fluorescent" light, it is meant light emitted by particles in the flow cell after the particles have been subjected to excitation light from the light source. In still further instances, the particle modulated light contains some combination of forward scattered light, side scattered light and fluorescent light. In certain embodiments, the particle scattered light that is focused by the objective lens and collected by the light collection module includes forward scattered light, side scattered light and fluorescent light. As discussed herein, a "flow cell" is described in its conventional sense to refer to a component, such as a cuvette, containing a liquid stream for transporting particles in a sheath fluid. The "interrogation point" discussed herein refers to a region within the flow cell in which the particle is irradiated by light from the light source for analysis. The size of the interrogation point may vary as desired. For example, where 0 μm represents the optical axis of light emitted by the light source, the interrogation point may range from −50 μm to 50 μm, such as −25 μm to 40 μm, and including −15 μm to 30 μm.

In embodiments, the subject light collection module includes a fiber optic light conveyor. As described herein, a "fiber optic light conveyor" refers to a transparent material for transmitting light from one end of the material to the other end. In certain embodiments, the fiber optic light conveyor is configured to convey particle-modulated light (e.g., forward scattered light, side scattered light and/or fluorescent light) collected from the flow cell to one or more detectors in a detector assembly. In some embodiments, the transparent material includes glass. In other embodiments, the transparent material includes plastic. In some embodiments, the fiber optic light conveyor is a single mode fiber. In other instances, the fiber optic light conveyor is a multimode fiber. The diameter of the fiber optic light conveyor may vary as desired. In some embodiments, the diameter of the subject fiber optic light conveyor ranges from 0.1 mm to 3 mm, such as 0.2 mm to 2.5 mm, 0.3 mm to 2.2 mm, 0.4 mm to 2 mm. 0.5 mm to 1.5 mm, and including 0.6 mm to 1.2 mm. In some instances, the diameter of the fiber optic light conveyor is 0.8 mm. In some embodiments, the fiber optic light conveyor includes a single fiber optic light conveyor. In other words, where the subject flow cytometers include multiple lasers, light from each laser is collected such that it is conveyed to detectors by a single fiber optic light conveyor, i.e., as opposed to an arrangement in which the flow cytometer contains multiple fiber optics and the light emitted by each laser is received by a respective fiber optic.

In further embodiments, the subject light collection module includes a refractive optical element. In certain instances, the refractive optical element is positioned between the objective lens and the fiber optic light conveyor. In some embodiments, the refractive optical element is located 10 mm or less from the fiber optic light conveyor, such as 5 mm or less, 2 mm or less, 1 mm or less, 0.5 mm or less, 0.1 mm or less, 0.05 mm or less, 0.001 mm and including where the refractive optical element and fiber optic light conveyor are in physical contact. In such embodiments, the refractive optical element is configured to collect objective lens focused light and project the collected objective lens focused light onto the surface of the fiber optic light conveyor so that the light may be conveyed to one or more detectors in a detector assembly. "Refraction" as discussed herein is described in its conventional sense to refer to light changing its direction after passing through a medium. As such, in embodiments, the refractive optical element is configured to alter the direction of objective lens focused light such that the light propagates along a single optical axis and illuminates the surface of the fiber optic light conveyor. In some instances, objective lens focused light is collected such that 70% or more of the objective lens focused light illuminates the surface of the fiber optic light conveyor and is subsequently conveyed to one or more detectors in the detector assembly, such as 80% or more, 90% or more, 95% or more, 97% or more, and including 99% or more of objective lens focused light. In embodiments, refraction by the refractive optical element provides additional optical power for coupling objective lens focused light into the fiber optic light conveyor.

Any convenient device for refracting and collecting light may be employed as the subject refractive optical element. In some embodiments, the refractive optical element is a prism. The "prism" discussed herein is described in its conventional sense to refer to a transparent optical element configured to refract light. Refractive optical elements of interest may include any suitable shape including but not limited to rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion, etc. In other embodiments, the refractive optical element includes a cylindrical lens. In such embodiments, the lens is configured to collect objective lens focused light and project the objective lens focused light onto the surface of the fiber optic light conveyor.

In some embodiments, the refractive optical element possesses a refractive index that ranges from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3. Depending on the transparency desired, refractive optical elements of interest may be formed from any suitable material including but not limited to glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In some embodiments, the refractive optical element has a transparency window of from 150 nm to 5 μm; from 180 nm to 8 μm, from 185 nm to 2.1 μm, from 200 nm to 6 μm, from 200 nm to 11 μm, from 250 nm to 1.6 μm, from 350 nm to 2 μm, from 600 nm to 16 μm, from 1.2 μm to 8 μm, from 2 μm to 16 μm or some other wavelength range.

In some instances, light refracted by the refractive optical element continues to propagate along an axis that is parallel to the optical axis established by the light source. In other embodiments, light refracted by the refractive optical element may propagate along an axis possessing an angle of deviation relative to the optical axis established by the light source. In such embodiments, deviation may range from 0.001 arc minute to 10 arc minute, such as from 0.005 arc minute to 9 arc minute, such as from 0.01 arc minute to 8 arc minute, such as from 0.05 arc minute to 7 arc minute, such as from 0.1 arc minute to 6 arc minute, such as from 0.5 arc minute to 5 arc minute and including from 1 arc minute to 3 arc minute. In some embodiments, the light separation component provides for a beam deviation that is 5 arc minute or less, such as 4 arc minute or less, such as 3 arc minute or less, such as 2 arc minute or less, such as 1 arc minute or less, such as 0.5 arc minute or less, such as 0.1 arc minute or less, such as 0.05 arc minute or less, such as 0.01 arc minute or less, such as 0.005 arc minute or less, such as 0.001 arc minute or less and including providing for a laser is beam deviation angle of 0.0001 arc minute or less.

The refractive optical element may be irradiated by the particle-modulated light at any suitable distance, such as at a distance of 0.001 mm or more from the flow cell, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more from the flow cell. Likewise, the refractive optical element may be irradiated by particle-modulated light emitted from the flow cell at any suitable angle, such as where the incident angle of irradiation ranges from 10° to 90°, such as from 15° to 85°, such as from 20° to 80°, such as from 25° to 75° and including from 30° to 60°.

As discussed above, aspects of the invention further include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics positioned between the light source and flow cell.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle to the flow cell, such as at an angle ranging from 10° to 90°, such as from 15° to 85°, such as from 20° to 80°, such as from 25° to 75° and including from 30° to 60°, for example at a 90° angle.

As discussed above, the subject flow cytometers may include one or more objective lenses, which may include one or a combination of a collimating lens, a focusing lens, a magnifying lens, a de-magnifying lens, or other lens, that are configured to receive light from an interrogation zone of a flow cell and produce imaged light that is transmitted to the light separation component. Any convenient light collection systems configured to produce objective lens focused light from an interrogation zone of a flow cell can be used. Examples of light collection systems that may be employed include those described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804; the disclosures of which are herein incorporated by reference.

Figure 3:
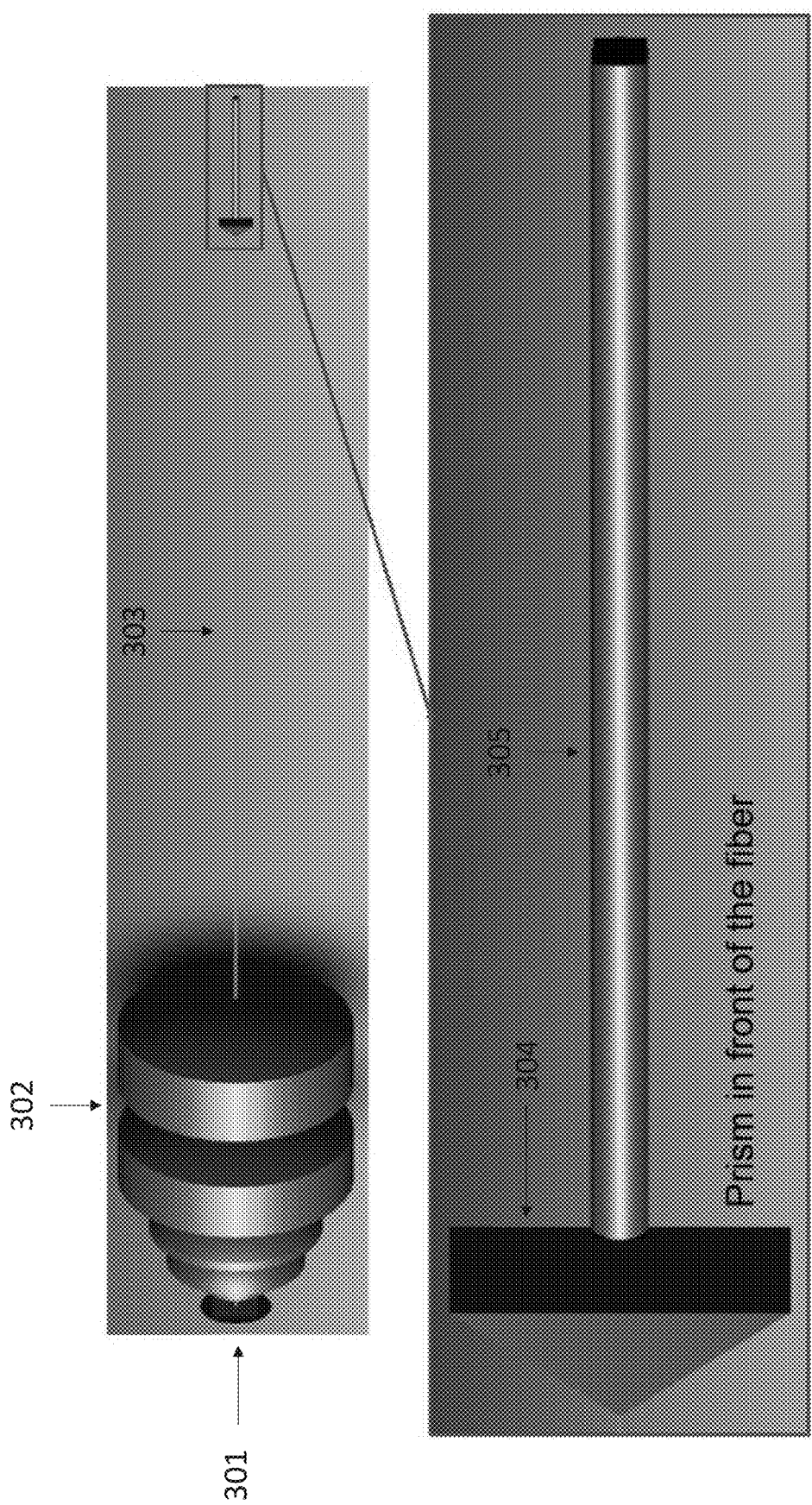
FIG. 3 depicts a light collection module according to certain embodiments.

FIG. 3 depicts a diagram of a light collection module according to certain embodiments of the invention. As shown in FIG. 3, particles passing through flow cell 301 are irradiated by light from a light source (not shown). Particle-modulated light from the flow cell is subsequently focused by objective lens 302 to generate objective lens focused light 303. The objective lens focused light 303 subsequently irradiates a refractive optical element (i.e., prism 304) which collects and projects the objective lens focused light 303 onto the surface of the fiber optic light conveyor 305.

Figure 4:
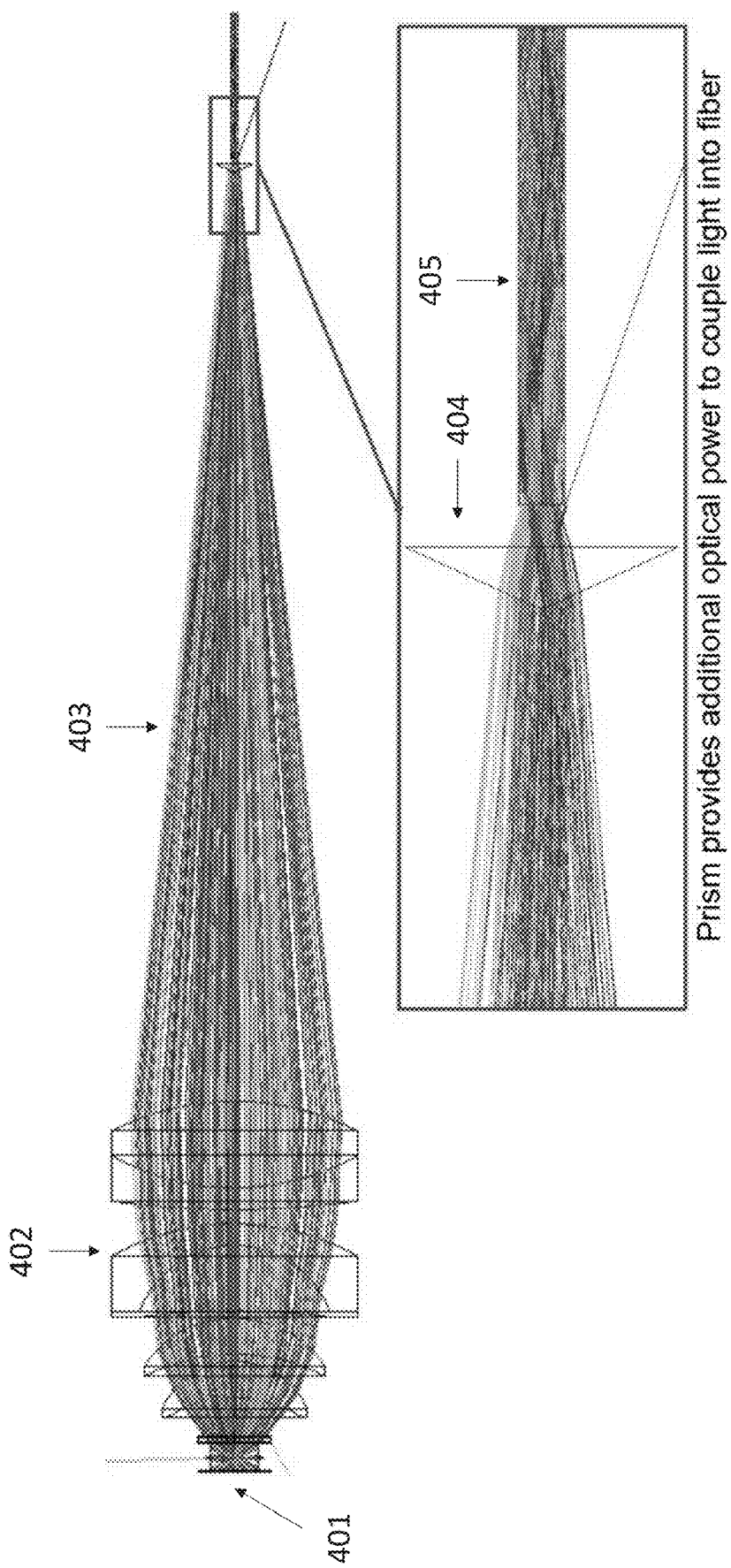
FIG. 4 depicts a simulation of light collected by a flow cytometric system including a light collection module according to certain embodiments.

FIG. 4 presents a simulation of collecting objective lens focused light via the light collection module described herein. As shown in FIG. 4, particles passing through flow cell 401 are irradiated by light from a light source (not shown). Particle-modulated light from the flow cell is subsequently focused by objective lens 402 to generate objective lens focused light 403. The objective lens focused light 403 subsequently irradiates a refractive optical element (i.e., prism 404) which collects and projects the objective lens focused light 403 onto the surface of the fiber optic light conveyor 405.

In additional embodiments, the subject light sources include multiple lasers, e.g., so that the particles in the flow cell are irradiated with multiple different wavelengths of light. Any convenient number of lasers may be included. In some embodiments, light sources of interest include 1 or more lasers configured to provide laser light for irradiation of the flow stream, such as 2 lasers or more configured to provide laser light for irradiation of the flow stream, such as 3 lasers or more, such as 4 lasers or more, such as 5 lasers or more, such as 10 lasers or more, such as 15 lasers or more, such as 25 lasers or more and including 50 lasers or more configured to provide laser light for irradiation of the flow stream. Where more than one laser is employed, the sample may be irradiated with the lasers simultaneously or sequentially, or a combination thereof. For example, the sample may be simultaneously irradiated with each of the lasers. In other embodiments, the flow stream is sequentially irradiated with each of the lasers. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each laser may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where sample is sequentially irradiated by more than two (i.e., 3 or more) lasers, the delay between irradiation by each laser may be the same or different.

In embodiments of the invention where the light source includes multiple lasers, the particle-modulated light and the corresponding objective lens focused light produced therefrom may include light from a plurality of focal spots. By "focal spot", it is meant a particular region of the interrogation zone of the flow cell that is irradiated by one or more of the lasers in the subject light source. In other words, each of the lasers focuses light on a different region of the flow cell, thereby producing a series of focal spots. In some embodiments, laser focal spots possess an elliptical beam shape. In such embodiments, the elliptical shape of the focal spots flattens the resulting laser profile so that the area in which the flow cell is irradiated with peak laser intensity is broadened thereby ensuring uniform laser intensity in the flow cell. In some embodiments, the elliptical shape of the focal spots described herein is produced by a tilted beam shaping optical component described in U.S. Provisional Application No. 63/094,111, the disclosure of which is herein incorporated by reference in its entirety. As particles pass through focal spots within the interrogation point of the flow cell, light within each focal spot is modulated by the particle and particle modulated light corresponding to each focal spot is thereby produced and collected (e.g., as described above). In some embodiments, focal spots possess a height ranging from 5 μm to 40 μm, such as 10 μm to 20 μm, and including 14 μm to 16 μm. In some embodiments, the height of the focal spots is 15 μm. In certain embodiments, the height of the focal spots is configured such that a particle of a given size will not exist in or overlap two focal spots at once. In some embodiments, the distance between laser focal spots is not less than the size of the particle to prevent simultaneous excitations of the particle by multiple lasers. In some embodiments, the present invention involves irradiating the flow cell with 2 or more focal spots, such as 3 or more, 4 or more, 5 or more, 6 or more, 7 or more, 9 or more and including 10 or more focal spots. As such, in some embodiments, the number of focal spots ranges from 2 to 6 focal spots, such as 2, 3, 4, 5, and 6 focal spots.

Figure 5:
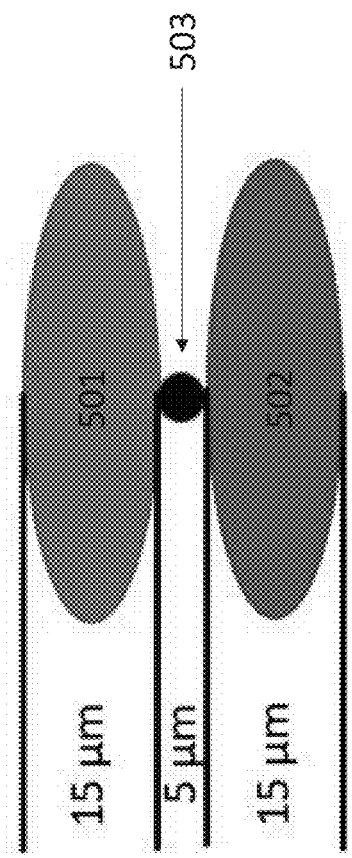
FIG. 5 depicts laser focal spot size and geometry.

For example, FIG. 5 depicts focal spot geometry. Particle 503 is shown situated between two focal spots 501 and 502. Focal spots 501 and 502 are each characterized by a height of 15 μm while the particle 503 possesses a height of 5 μm.

Figure 6:
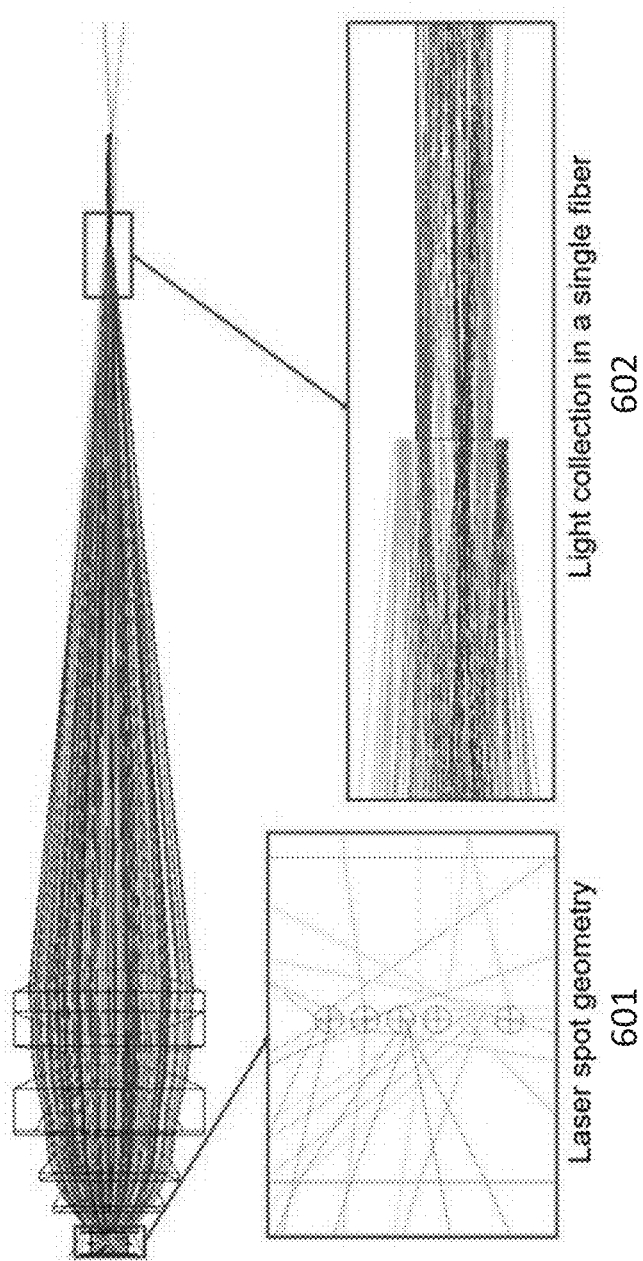
FIG. 6 depicts a simulation of collecting light from laser focal spots with a flow cytometric system including a light collection module according to certain embodiments.

FIG. 6 depicts a simulation of collecting light generated by particles passing through 6 different focal spots with a light collection module according to certain embodiments of the invention. Each of the laser spots shown in the interrogation zone 601 of the flow cell possesses a height of 15 μm and is spaced 5 μm from adjacent focal spots (e.g., as shown in FIG. 5). Light modulated by particles passing through each of the focal spots are collected by a light collection module 602 (e.g., as discussed above) for detection.

Figure 7C:
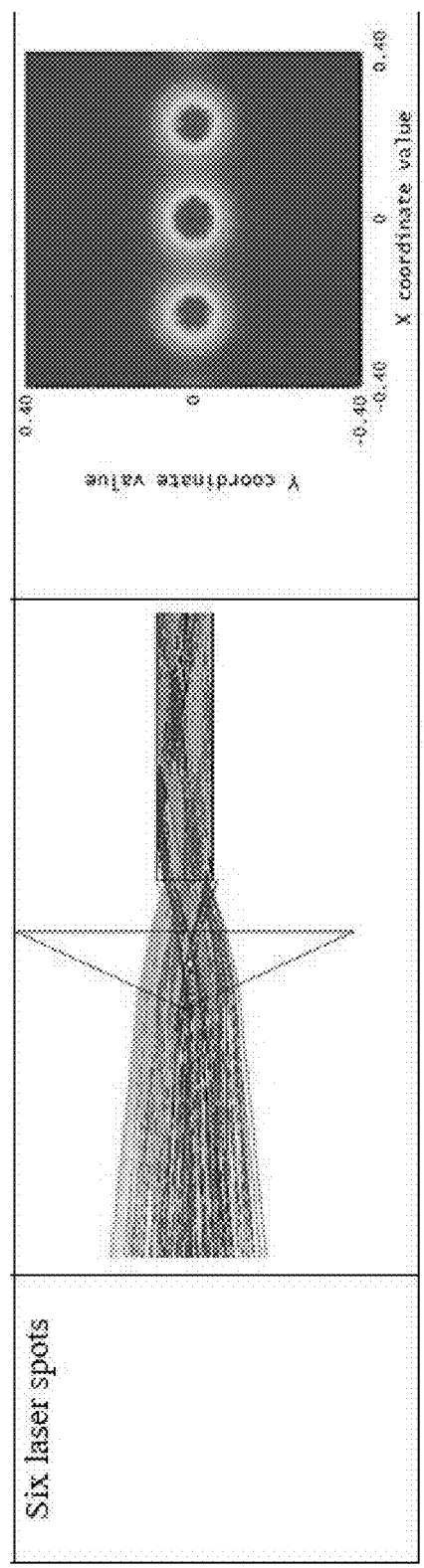

FIG. 7A-C presents a simulation demonstrating the differential detection of light from particles passing through each of the 6 different focal spots described above with respect to FIG. 6. As shown in FIG. 7A, particle scattered light resulting from a particle passing through the three top focal spots shown in interrogation point 601 is refracted by the refractive optical element and directed onto the fiber optic light conveyor (middle panel). A resulting irradiance profile is shown in the right panel. Similarly, in FIG. 7B, particle scattered light resulting from a particle passing through the three bottom focal spots shown in interrogation point 601 is refracted by the refractive optical element and directed onto the fiber optic light conveyor (middle panel). A resulting irradiance profile is shown in the right panel. In FIG. 7C, particle scattered light resulting from a particle passing through all six focal spots shown in interrogation point 601 is refracted by the refractive optical element and directed onto the fiber optic light conveyor (middle panel). A resulting irradiance profile is shown in the right panel.

Figure 8:
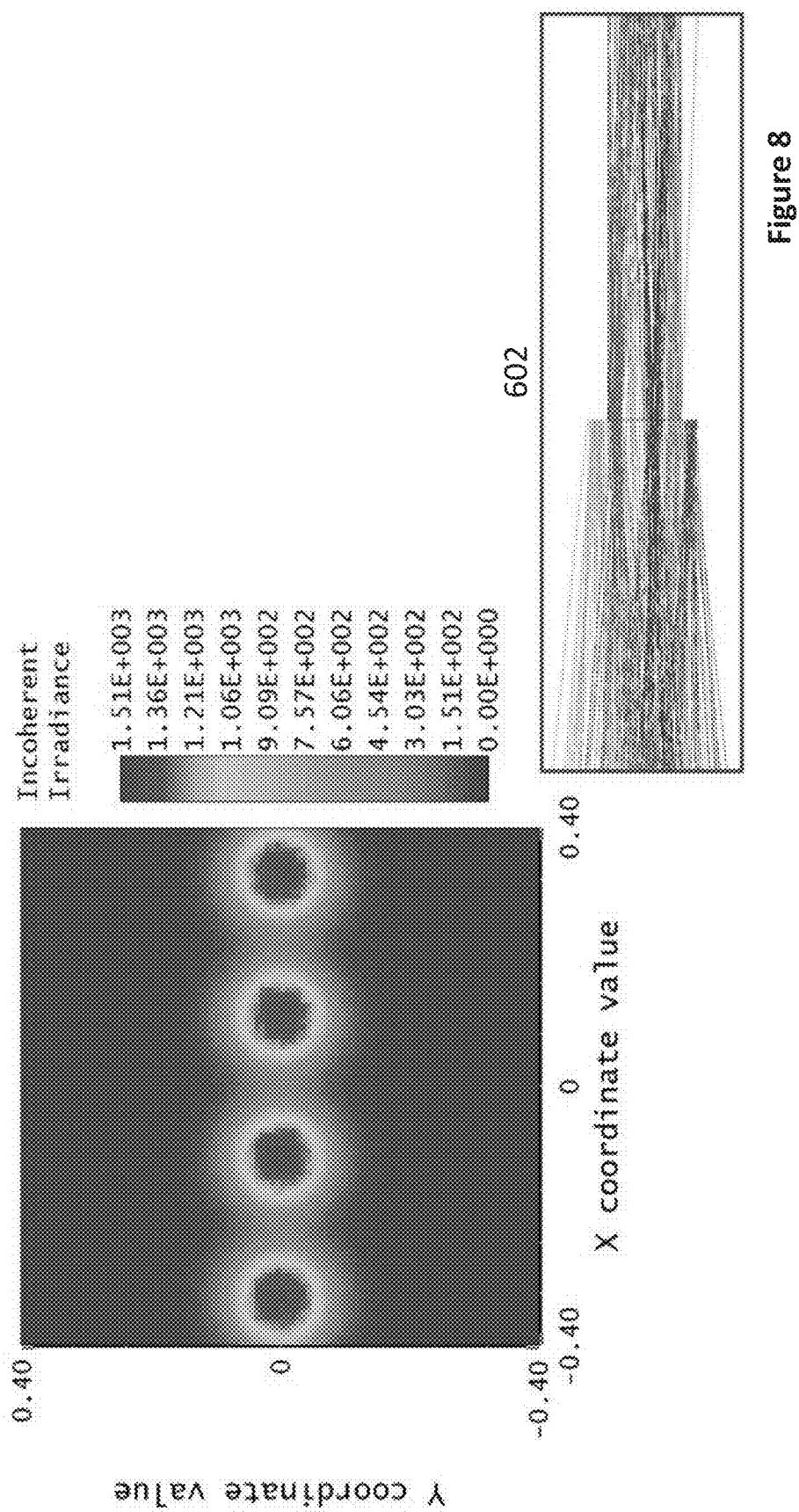
FIG. 8 depicts an irradiance distribution of light from laser focal spots collected by a flow cytometric system including a light collection module.

FIG. 8 depicts an irradiance distribution at the input face of the fiber optic light conveyor of the light collection module 602 shown in FIG. 6. As shown in FIG. 8, light from four different focal spots is evident in the irradiance distribution.

Aspects of the invention further include a detector assembly operably coupled to the fiber optic light conveyor. As discussed above, the subject light collection module is configured to modulate and detect particle-modulated light (i.e., forward scattered, side scattered and fluorescent light). As such, where desired, the above components may be implemented in a forward scattered light channel, a side scattered light channel, or a fluorescent channel. In some embodiments, all wavelengths of light (e.g., including forward scattered, side scattered and fluorescent light) are collected by the light collection element described herein and is subsequently directed to the relevant detectors. Therefore, the subject detector assembly may include any combination of forward scattered light detectors, side scattered light detectors and fluorescent light detectors, as desired.

As such, aspects of the flow cytometers may include a forward scatter detector configured to detect forward scattered light. The number of forward scatter detectors in the subject flow cytometers may vary, as desired. For example, the subject flow cytometers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors.

Any convenient detector for detecting collected light may be used in the forward scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the flow cytometers include multiple forward scatter detectors, each detector may be the same, or the collection of detectors may be a combination of different types of detectors. For example, where the subject flow cytometers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention also include a light dispersion/separator module positioned between the light collection module and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the light detection module and the forward scatter detector. In other embodiments, more than one bandpass filter is positioned between the light detection module and the forward scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward scatter detector.

Certain embodiments of the invention include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple side scatter detectors, each side scatter detector may be the same, or the collection of side scatter detectors may be a combination of different types of detectors. For example, where the subject flow cytometers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the light detection module and the side scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the light detection module and the fluorescent light detector. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) Ann Clin Biochem. January; 49(pt 1):17-28; Linden, et. al., Semin Throm Hemost. 2004 October; 30(5): 502-11; Alison, et al. *J Pathol*, 2010 December; 222(4):335-344; and Herbig, et al. (2007) Crit Rev Ther Drug Carrier Syst. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD iosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 9:
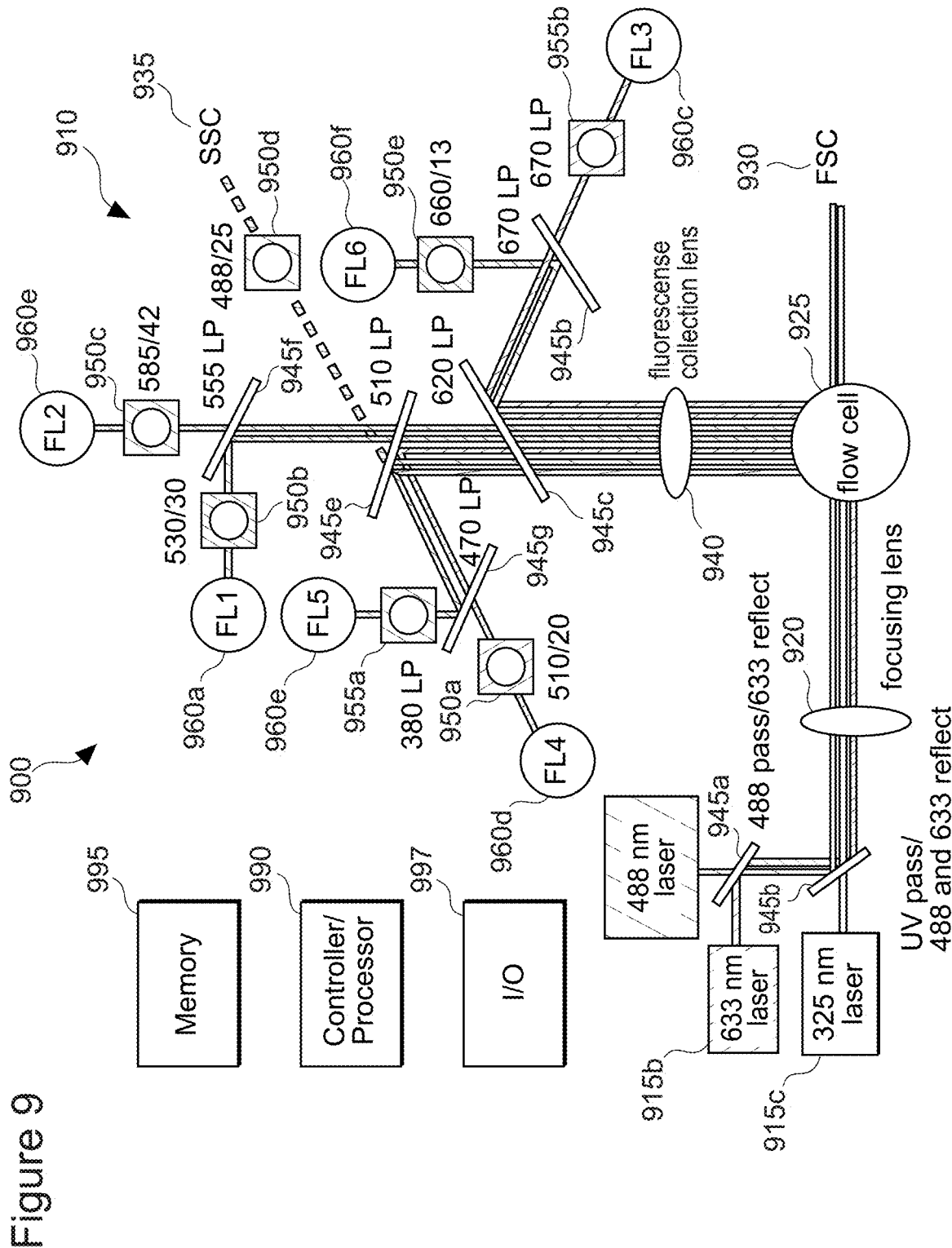
FIG. 9 depicts a flow cytometer including a light collection module according to certain embodiments.

FIG. 9 shows a system 900 for flow cytometry in accordance with an illustrative embodiment of the present invention. The system 900 includes a flow cytometer 910, a controller/processor 990 and a memory 995. The flow cytometer 910 includes one or more excitation lasers 915a-915c, a flow cell 925, an objective lens 901, a refractive optical element 902, a fiber optic light conveyor 903, a forward scatter detector 930, a side scatter detector 935, a fluorescence collection lens 940, one or more beam splitters 945a-945g, one or more bandpass filters 950a-950e, one or more longpass ("LP") filters 955a-955b, and one or more fluorescent light detectors 960a-960f.

The excitation lasers 915a-c emit light in the form of a laser beam. The wavelengths of the laser beams emitted from excitation lasers 915a-915c are 488 nm, 633 nm, and 325 nm, respectively, in the example system of FIG. 9. The laser beams are first directed through one or more of beam splitters 945a and 945b. Beam splitter 945a transmits light at 488 nm and reflects light at 933 nm. Beam splitter 945b transmits UV light (light with a wavelength in the range of 10 to 400 nm) and reflects light at 488 nm and 633 nm.

The laser beams are then directed onto the portion of a fluid stream where particles of a sample are located, within the flow cell 925. The laser beams generate focal spots within the interrogation point of the flow cell, e.g., as described above. The flow cell is part of a fluidics system which directs particles, typically one at a time, in a stream to the focused laser beam for interrogation.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. Laser light modulated by the particle in this way is subsequently focused by objective lens 901 onto refractive optical element 902 which collects the objective lens focused light and projects it onto fiber optic light conveyor 903. The fluorescence emissions as well as the diffracted light, refracted light, reflected light, and scattered light may be routed via the fiber optic light conveyor 903 to one or more of the forward scatter detector 930, side scatter detector 935, and the one or more fluorescent light detectors 960a-960f through one or more of the beam splitters 945a-945g, the bandpass filters 950a-950e, the longpass filters 955a-955b, and the fluorescence collection lens 940.

The fluorescence collection lens 940 collects light emitted from the particle-laser beam interaction and routes that light towards one or more beam splitters and filters. Bandpass filters, such as bandpass filters 950a-950e, allow a narrow range of wavelengths to pass through the filter. For example, bandpass filter 950a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 955a-955b, transmit wavelengths of light equal to or longer than a specified wavelength of light. For example, longpass filter 955a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 945g is a 620 SP beam splitter, meaning that the beam splitter 945g transmits wavelengths of light that are 620 nm or shorter and reflects wavelengths of light that are longer than 620 nm in a different direction. In one embodiment, the beam splitters 945a-945g can comprise optical mirrors, such as dichroic mirrors.

The forward scatter detector 930 is positioned off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 935 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 960a-960f. The side scatter detector 935 and fluorescent light detectors can include photomultiplier tubes. The signals detected at the forward scatter detector 930, the side scatter detector 935 and the fluorescent detectors can be converted to electronic signals (voltages) by the detectors. This data can provide information about the sample.

In operation, cytometer operation is controlled by a controller/processor 990, and the measurement data from the detectors can be stored in the memory 995 and processed by the controller/processor 990. Although not shown explicitly, the controller/processor 990 is coupled to the detectors to receive the output signals therefrom, and may also be coupled to electrical and electromechanical components of the flow cytometer 900 to control the lasers, fluid flow parameters, and the like. Input/output (I/O) capabilities 997 may be provided also in the system. The memory 995, controller/processor 990, and I/O 997 may be entirely provided as an integral part of the flow cytometer 910. In such an embodiment, a display may also form part of the I/O capabilities 997 for presenting experimental data to users of the cytometer 900. Alternatively, some or all of the memory 995 and controller/processor 990 and I/O capabilities may be part of one or more external devices such as a general purpose computer. In some embodiments, some or all of the memory 995 and controller/processor 990 can be in wireless or wired communication with the cytometer 910. The controller/processor 990 in conjunction with the memory 995 and the I/O 997 can be configured to perform various functions related to the preparation and analysis of a flow cytometer experiment.

The system illustrated in FIG. 9 includes six different detectors that detect fluorescent light in six different wavelength bands (which may be referred to herein as a "filter window" for a given detector) as defined by the configuration of filters and/or splitters in the beam path from the flow cell 925 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 997 can be configured to receive data regarding a flow cytometer experiment having a panel of fluorescent labels and a plurality of cell populations having a plurality of markers, each cell population having a subset of the plurality of markers. The I/O 997 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 995. The controller/processor 990 can be configured to evaluate one or more assignments of labels to markers.

One of skill in the art will recognize that a flow cytometer in accordance with an embodiment of the present invention is not limited to the flow cytometer depicted in FIG. 9, but can include any flow cytometer known in the art. For example, a flow cytometer may have any number of lasers, beam splitters, filters, and detectors at various wavelengths and in various different configurations.

Figure 10:
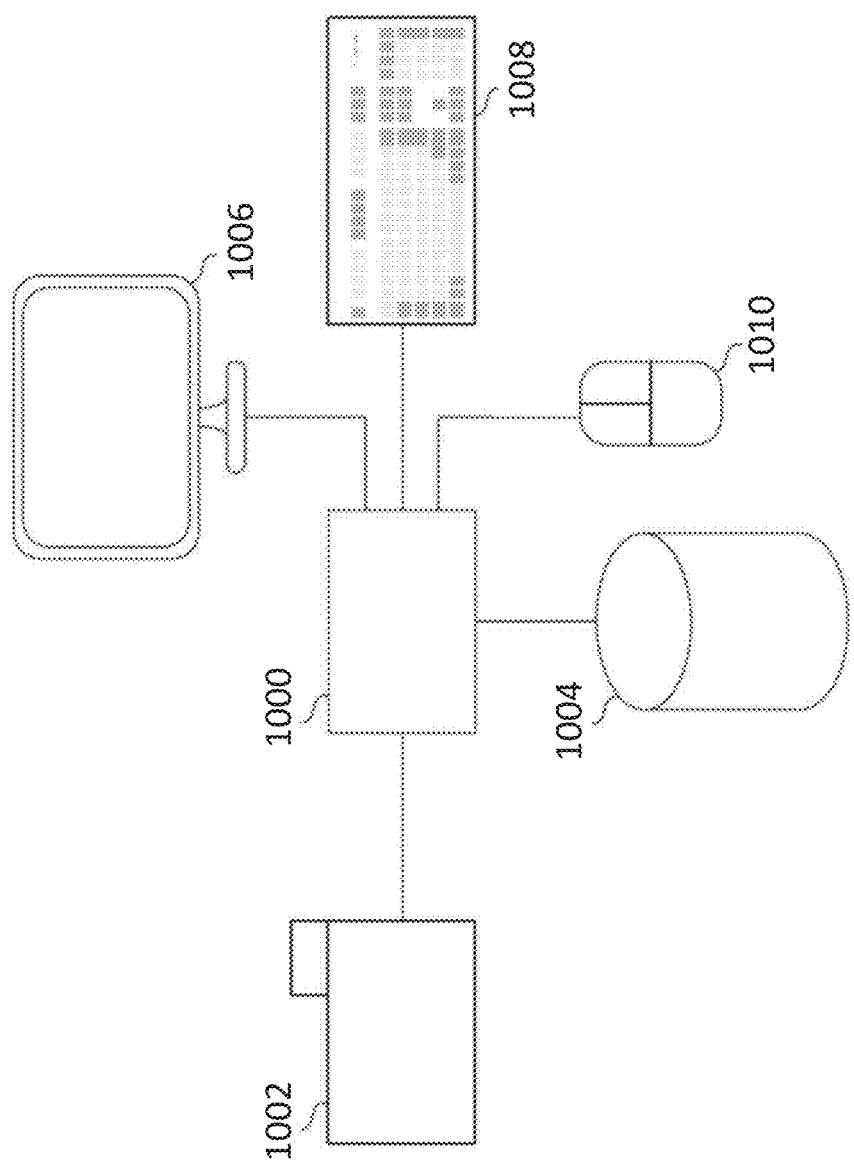
FIG. 10 depicts a block diagram of a computing system according to certain embodiments.

FIG. 10 shows a functional block diagram for one example of a processor 1000, for analyzing and displaying data. A processor 1000 can be configured to implement a variety of processes for controlling graphic display of biological events. A flow cytometer 1002 can be configured to acquire flow cytometer data by analyzing a biological sample (e.g., as described above). The flow cytometer can be configured to provide biological event data to the processor 1000. A data communication channel can be included between the flow cytometer 1002 and the processor 1000. The data can be provided to the processor 1000 via the data communication channel. The processor 1000 can be configured to provide a graphical display including plots (e.g., as described above) to display 1006. The processor 1000 can be further configured to render a gate around populations of flow cytometer data shown by the display device 1006, overlaid upon the plot, for example. In some embodiments, the gate can be a logical combination of one or more graphical regions of interest drawn upon a single parameter histogram or bivariate plot. In some embodiments, the display can be used to display analyte parameters or saturated detector data.

The processor 1000 can be further configured to display flow cytometer data on the display device 1006 within the gate differently from other events in the fluorescent flow cytometer data outside of the gate. For example, the processor 1000 can be configured to render the color of flow cytometer data contained within the gate to be distinct from the color of flow cytometer data outside of the gate. In this way, the processor 1000 may be configured to render different colors to represent each unique population of data. The display device 1006 can be implemented as a monitor, a tablet computer, a smartphone, or other electronic device configured to present graphical interfaces.

The processor 1000 can be configured to receive a gate selection signal identifying the gate from a first input device. For example, the first input device can be implemented as a mouse 1010. The mouse 1010 can initiate a gate selection signal to the processor 1000 identifying the population to be displayed on or manipulated via the display device 1006 (e.g., by clicking on or in the desired gate when the cursor is positioned there). In some implementations, the first device can be implemented as the keyboard 1008 or other means for providing an input signal to the processor 1000 such as a touchscreen, a stylus, an optical detector, or a voice recognition system. Some input devices can include multiple inputting functions. In such implementations, the inputting functions can each be considered an input device. For example, as shown in FIG. 10, the mouse 1010 can include a right mouse button and a left mouse button, each of which can generate a triggering event.

The triggering event can cause the processor 1000 to alter the manner in which the fluorescent flow cytometer data is displayed, which portions of the data is actually displayed on the display device 1006, and/or provide input to further processing such as selection of a population of interest for analysis.

In some embodiments, the processor 1000 can be configured to detect when gate selection is initiated by the mouse 1010. The processor 1000 can be further configured to automatically modify plot visualization to facilitate the gating process. The modification can be based on the specific distribution of data received by the processor 1000.

The processor 1000 can be connected to a storage device 1004. The storage device 1004 can be configured to receive and store data from the processor 1000. The storage device 1004 can be further configured to allow retrieval of data, such as flow cytometer data, by the processor 1000.

A display device 1006 can be configured to receive display data from the processor 1000. The display data can comprise plots of fluorescent flow cytometer data and gates outlining sections of the plots. The display device 1006 can be further configured to alter the information presented according to input received from the processor 1000 in conjunction with input from apparatus 1002, the storage device 1004, the keyboard 1008, and/or the mouse 1010.

In some implementations the processor 1000 can generate a user interface to receive example events for sorting. For example, the user interface can include a control for receiving example events or example images. The example events or images or an example gate can be provided prior to collection of event data for a sample, or based on an initial set of events for a portion of the sample.

Methods of Analyzing a Sample in a Flow Cytometer Including a Light Collection Module Aspects of the present disclosure include methods for analyzing a sample in a flow cytometer having a light source for irradiating a particle passing through a flow cell at an interrogation point, an objective lens for focusing particle-modulated light, and a light collection module for collecting objective lens focused light. In certain embodiments, the light collection module used for collecting objective lens focused light includes a fiber optic light conveyor and a refractive optical element positioned between the objective lens and the fiber optic light conveyor.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

As discussed above, aspects of the invention involve analyzing a sample in a flow cytometer including a light source for irradiating a particle passing through a flow cell at an interrogation point, an objective lens for focusing particle-modulated light, and a light collection module for collecting objective lens focused light. By "collecting" objective lens focused light, it is meant gathering light modulated by the particles in the flow cell following the irradiation thereof so that it can be conveyed to a set of detectors for detection. In some instances, the particle modulated light is forward scattered light. In additional instances, the particle-modulated light is side scattered light. In still additional instances, the particle-modulated light is fluorescent light. In still further instances, the particle modulated light contains some combination of forward scattered light, side scattered light and fluorescent light. In certain embodiments, the particle scattered light that is focused by the objective lens and collected by the light collection module includes forward scattered light, side scattered light and fluorescent light. As discussed herein, a "flow cell" is described in its conventional sense to refer to a component, such as a cuvette, containing a liquid stream for transporting particles in a sheath fluid. The "interrogation point" discussed herein refers to a region within the flow cell in which the particle is irradiated by light from the light source for analysis. The size of the interrogation point may vary as desired. For example, where 0 µm represents the optical axis of light emitted by the light source, the interrogation point may range from −50 µm to 50 µm, such as −25 µm to 40 µm, and including −15 µm to 30 µm.

In embodiments, the subject light collection module includes a fiber optic light conveyor. As discussed herein, a "fiber optic light conveyor" is described in its conventional sense to refer to a transparent material for transmitting light from one end of the material to the other end. In certain embodiments, the fiber optic light conveyor is configured to convey particle-modulated light (e.g., forward scattered light, side scattered light and/or fluorescent light) collected from the flow cell to one or more detectors. In some embodiments, the transparent material includes glass. In other embodiments, the transparent material includes plastic. In some embodiments, the fiber optic light conveyor is a single mode fiber. In other instances, the fiber optic light conveyor is a multi-mode fiber. The diameter of the fiber optic light conveyor may vary as desired. In some embodiments, the diameter of the subject fiber optic light conveyor ranges from 0.1 mm to 3 mm, such as 0.2 mm to 2.5 mm, 0.3 mm to 2.2 mm, 0.4 mm to 2 mm. 0.5 mm to 1.5 mm, and including 0.6 mm to 1.2 mm. In some instances, the diameter of the fiber optic light conveyor is 0.8 mm. In some embodiments, the fiber optic light conveyor includes a single fiber optic light conveyor. In other words, where the subject flow cytometers include multiple lasers, light from each laser is collected such that it is conveyed to detectors by a single fiber optic light conveyor, i.e., as opposed to an arrangement in which the flow cytometer contains multiple fiber optics and the light emitted by each laser is received by a respective fiber optic.

In further embodiments, the subject light collection module includes a refractive optical element. In certain instances, the refractive optical element is positioned between the objective lens and the fiber optic light conveyor. In some embodiments, the refractive optical element is located 10 mm or less from the fiber optic light conveyor, such as 5 mm or less, 2 mm or less, 1 mm or less, 0.5 mm or less, 0.1 mm or less, 0.05 mm or less, 0.001 mm and including where the refractive optical element and fiber optic light conveyor are in physical contact. In such embodiments, the refractive optical element is configured to collect objective lens focused light and project the collected objective lens focused light onto the surface of the fiber optic light conveyor so that the light may be conveyed to one or more detectors in a detector assembly. "Refraction" as discussed herein is described in its conventional sense to refer to light changing its direction after passing through a medium. As such, in embodiments, the refractive optical element is configured to alter the direction of objective lens focused light such that the light propagates along a single optical axis and illuminates the surface of the fiber optic light conveyor.

In some instances, objective lens focused light is collected such that 70% or more of the objective lens focused light illuminates the surface of the fiber optic light conveyor and is subsequently conveyed to one or more detectors in a detector assembly, such as 80% or more, 90% or more, 95% or more, 97% or more, and including 99% or more of objective lens focused light. In embodiments, refraction by the refractive optical element provides additional optical power for coupling objective lens focused light into the fiber optic light conveyor.

Any convenient device for refracting and collecting light may be employed as the subject refractive optical element. In some embodiments, the refractive optical element is a prism. The "prism" discussed herein is described in its conventional sense to refer to a transparent optical element configured to refract light. Refractive optical elements of interest may include any suitable shape including but not limited to rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion, etc. In other embodiments, the refractive optical element includes a cylindrical lens. In such embodiments, the lens is configured to collect objective lens focused light and project the objective lens focused light onto the surface of the fiber optic light conveyor.

In some embodiments, the refractive optical element possesses a refractive index that ranges from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3. Depending on the transparency desired, refractive optical elements of interest may be formed from any suitable material including but not limited to glass (e.g., N-SF10, N-SF11, N-SF57, N-BK7, N-LAK21 or N-LAF35 glass), silica (e.g., fused silica), quartz, crystal (e.g., $CaFd_2$ crystal), zinc selenide (ZnSe), $F_2$, germanium (Ge) titanate (e.g., S-TIH11), borosilicate (e.g., BK7). In some embodiments, the refractive optical element has a transparency window of from 150 nm to 5 µm; from 180 nm to 8 µm, from 185 nm to 2.1 µm, from 200 nm to 6 µm, from 200 nm to 11 µm, from 250 nm to 1.6 µm, from 350 nm to 2 µm, from 600 nm to 16 µm, from 1.2 µm to 8 µm, from 2 µm to 16 µm or some other wavelength range.

In some instances, light refracted by the refractive optical element continues to propagate along an axis that is parallel to the optical axis established by the light source. In other embodiments, light refracted by the refractive optical element may propagate along an axis possessing an angle of deviation relative to the optical axis established by the light source. In such embodiments, deviation may range from 0.001 arc minute to 10 arc minute, such as from 0.005 arc minute to 9 arc minute, such as from 0.01 arc minute to 8 arc minute, such as from 0.05 arc minute to 7 arc minute, such as from 0.1 arc minute to 6 arc minute, such as from 0.5 arc minute to 5 arc minute and including from 1 arc minute to 3 arc minute. In some embodiments, the light separation component provides for a beam deviation that is 5 arc minute or less, such as 4 arc minute or less, such as 3 arc minute or less, such as 2 arc minute or less, such as 1 arc minute or less, such as 0.5 arc minute or less, such as 0.1 arc minute or less, such as 0.05 arc minute or less, such as 0.01 arc minute or less, such as 0.005 arc minute or less, such as 0.001 arc minute or less and including providing for a laser beam deviation angle of 0.0001 arc minute or less.

The refractive optical element may be irradiated by the particle-modulated light at any suitable distance, such as at a distance of 0.001 mm or more from the flow cell, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more from the flow cell. Likewise, the refractive optical element may be irradiated by particle-modulated light emitted from the flow cell at any suitable angle, such as where the incident angle of irradiation ranges from 10° to 90°, such as from 15° to 85°, such as from 20° to 80°, such as from 25° to 75° and including from 30° to 60°.

As discussed above, aspects of the invention further include irradiating the sample with a light source. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics positioned between the light source and flow cell.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The laser may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle to the flow cell, such as at an angle ranging from 10° to 90°, such as from 15° to 85°, such as from 20° to 80°, such as from 25° to 75° and including from 30° to 60°, for example at a 90° angle.

In additional embodiments, methods include irradiating the sample with multiple lasers, e.g., so that the particles in the flow cell are irradiated with multiple different wavelengths of light. Any convenient number of lasers may be included. In some embodiments, light sources of interest include 1 or more lasers configured to provide laser light for irradiation of the flow stream, such as 2 lasers or more configured to provide laser light for irradiation of the flow stream, such as 3 lasers or more, such as 4 lasers or more, such as 5 lasers or more, such as 10 lasers or more, such as 15 lasers or more, such as 25 lasers or more and including 50 lasers or more configured to provide laser light for irradiation of the flow stream. Where more than one laser is employed, the sample may be irradiated with the lasers simultaneously or sequentially, or a combination thereof. For example, the sample may be simultaneously irradiated with each of the lasers. In other embodiments, the flow stream is sequentially irradiated with each of the lasers. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each laser may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where sample is sequentially irradiated by more than two (i.e., 3 or more) lasers, the delay between irradiation by each laser may be the same or different.

In embodiments of the invention where the light source includes multiple lasers, the particle-modulated light and the corresponding objective lens focused light produced therefrom may include light from a plurality of focal spots. By "focal spot", it is meant a particular region of the interrogation zone of the flow cell that that is irradiated by one or more of the lasers in the subject light source. In other words, each of the lasers focuses light on a different region of the flow cell, thereby producing a series of focal spots. In some embodiments, laser focal spots possess an elliptical beam shape. In such embodiments, the elliptical shape of the focal spots flattens the resulting laser profile so that the area in which the flow cell is irradiated with peak laser intensity is broadened thereby ensuring uniform laser intensity in the flow cell. In some embodiments, the elliptical shape of the focal spots described herein is produced by a tilted beam shaping optical component described in U.S. Provisional Application No. 63/094,111, the disclosure of which is herein incorporated by reference in its entirety. As particles pass through focal spots within the interrogation point of the flow cell, light within each focal spot is modulated by the particle and particle modulated light corresponding to each focal spot is thereby produced and collected (e.g., as described above). In some embodiments, focal spots possess a height ranging from 5 µm to 40 µm, such as 10 µm to 20 µm, and including 14 µm to 16 µm. In some embodiments, the height of the focal spots is 15 µm. In certain embodiments, the height of the focal spots is configured such that a particle of a given size will not exist in or overlap two focal spots at once. In some embodiments, the distance between laser spots is not less than the size of the particle to prevent simultaneous excitations of the particle by multiple lasers. In some embodiments, the present invention involves irradiating the flow cell with 2 or more focal spots, such as 3 or more, 4 or more, 5 or more, 6 or more, 7 or more, 9 or more and including 10 or more focal spots. As such, in some embodiments, the number of focal spots ranges from 2 to 6 focal spots, such as 2, 3, 4, 5, and 6 focal spots.

Aspects of the invention further include detecting light collected by the light collection module via a detector assembly. As discussed above, the subject light collection module is configured to modulate and detect particle-modulated light (i.e., forward scattered, side scattered and fluorescent light). As such, where desired, the above components may be implemented in a forward scattered light channel, a side scattered light channel, or a fluorescent channel. In some embodiments, all wavelengths of light (e.g., including forward scattered, side scattered and fluorescent light) are collected by the light collection module described herein and is subsequently directed to the relevant detectors. Therefore, the subject detector assembly may include any combination of forward scattered light detectors, side scattered light detectors and fluorescent light detectors, as desired.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for receiving and analyzing flow cytometer data that has been collected from the irradiation of particles in a flow cytometer that includes a light collection module having a fiber optic light conveyor and a refractive optical element.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT, Windows XP, Windows 7, Windows 8, iOS, Oracle Solaris, Linux, OS/400, Compaq Tru64 Unix, SGI IRIX, Siemens Reliant Unix, and others.

Figure 11:
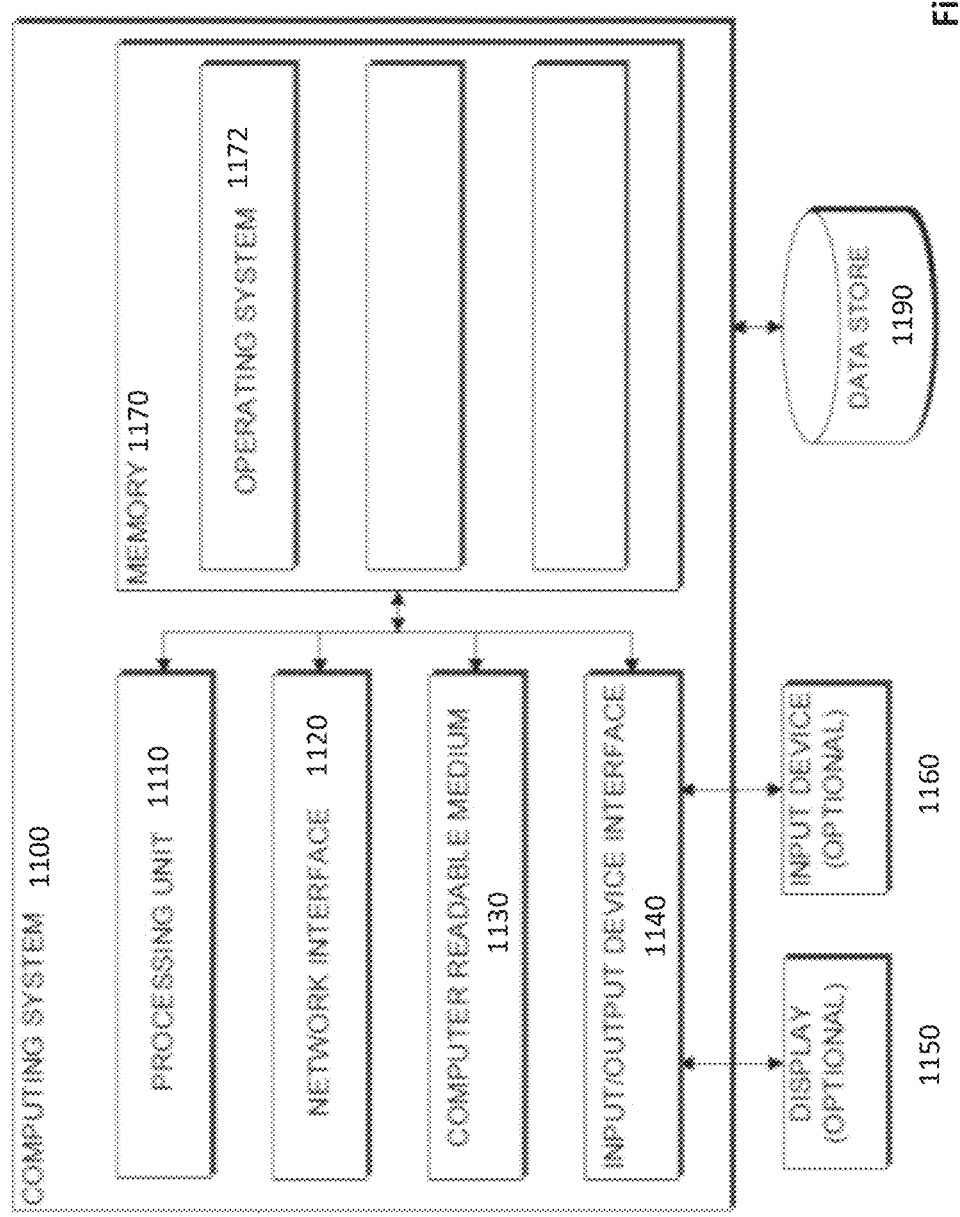
FIG. 11 depicts a block diagram of a computing system according to certain embodiments.

FIG. 11 depicts a general architecture of an example computing device 1100 according to certain embodiments. The general architecture of the computing device 1100 depicted in FIG. 11 includes an arrangement of computer hardware and software components. It is not necessary, however, that all of these generally conventional elements be shown in order to provide an enabling disclosure. As illustrated, the computing device 1100 includes a processing unit 1110, a network interface 1120, a computer readable medium drive 1130, an input/output device interface 1140, a display 1150, and an input device 1160, all of which may communicate with one another by way of a communication bus. The network interface 1120 may provide connectivity to one or more networks or computing systems. The processing unit 1110 may thus receive information and instructions from other computing systems or services via a network. The processing unit 1110 may also communicate to and from memory 1170 and further provide output information for an optional display 1150 via the input/output device interface 1140. For example, an analysis software (e.g., data analysis software or program such as FlowJo®) stored as executable instructions in the non-transitory memory of the analysis system can display the flow cytometry event data to a user. The input/output device interface 1140 may also accept input from the optional input device 1160, such as a keyboard, mouse, digital pen, microphone, touch screen, gesture recognition system, voice recognition system, gamepad, accelerometer, gyroscope, or other input device.

The memory 1170 may contain computer program instructions (grouped as modules or components in some embodiments) that the processing unit 1110 executes in order to implement one or more embodiments. The memory 1170 generally includes RAM, ROM and/or other persistent, auxiliary or non-transitory computer-readable media. The memory 1170 may store an operating system 1172 that provides computer program instructions for use by the processing unit 1110 in the general administration and operation of the computing device 1100. Data may be stored in data storage device 1190. The memory 1170 may further include computer program instructions and other information for implementing aspects of the present disclosure.

Utility

The subject flow cytometers and methods find use in a variety of applications where it is desirable to increase resolution and accuracy in the determination of parameters for analytes (e.g., cells, particles) in a biological sample. The subject flow cytometers and methods particularly find use where it is desirable to reduce flow cytometer complexity by providing for smaller system size, smaller system weight, and less power consumption. For example, the present disclosure can be used to reduce the number of fiber optic components necessary for light collection and detection. The subject flow cytometers and methods also find use in analyzing particles in a flow cell having a plurality of focal spots by ensuring the distance between laser spots is not less than the size of the particle to prevent simultaneous excitations from multiple lasers, and collecting particle-modulated light from the flow cell into a single fiber optic light conveyor.

The present disclosure can be employed to characterize many types of analytes, in particular, analytes relevant to medical diagnosis or protocols for caring for a patient, including but not limited to: proteins (including both free proteins and proteins bound to the surface of a structure, such as a cell), nucleic acids, viral particles, and the like. Further, samples can be from in vitro or in vivo sources, and samples can be diagnostic samples.

Kits

Aspects of the present disclosure further include kits, where kits include one or more light collection modules having a refractive optical element and a fiber optic light conveyor. In some embodiments, the subject kits include refractive optical elements and fiber optic conveyors for implementation in an existing flow cytometric system. In such embodiments, the kits may include instructions for removing optical components (e.g., fiber sets) in the existing flow cytometric systems so that they may be replaced with the subject light collection module having a refractive optical element and fiber optic light conveyor. The instructions included in the kits may also provide instructions for operationally coupling the fiber optic light conveyor to the one or more detectors present in the detector assembly such that light conveyed by the fiber optic light conveyor is detected.

The instructions described herein may be included on storage media such as a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS). Any of these program storage media, or others now in use or that may later be developed, may be included in the subject kits. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A flow cytometer comprising:
a light source for irradiating a particle passing through a flow cell at an interrogation point;
an objective lens for focusing particle-modulated light; and
a light collection module for collecting objective lens focused light, wherein the light collection module comprises:
a single fiber optic light conveyor; and
a refractive optical element positioned between the objective lens and the single fiber optic light conveyor, wherein the refractive optical element is configured to direct the objective lens focused light onto the surface of the single fiber optic light conveyor.

2. The flow cytometer according to claim 1, wherein the refractive optical element is a prism.

3. The flow cytometer according to claim 1, wherein the refractive optical element is a cylindrical lens.

4. The flow cytometer according to claim 1, wherein the refractive optical element is separated from the flow cell by a distance ranging from 40 mm to 200 mm.

5. The flow cytometer according to claim 1, wherein the refractive optical element is configured to refract the objective lens focused light such that it propagates along a single optical axis.

6. The flow cytometer according to claim 1, wherein the fiber optic light conveyor possesses a diameter ranging from 0.6 mm to 1.2 mm.

7. The flow cytometer according to claim 1, wherein the light source is configured to simultaneously irradiate a plurality of particles passing through the flow cell at the interrogation point.

8. The flow cytometer according to claim 1, wherein the objective lens focused light comprises light from a plurality of focal spots located within the interrogation point.

9. The flow cytometer according to claim 8, wherein the plurality of focal spots ranges from 2 to 6 focal spots.

10. The flow cytometer according to claim 8, wherein the light from each of the plurality of focal spots is directed onto the surface of the fiber optic light conveyor.

11. The flow cytometer according to claim 1, wherein the light collection module further comprises a detector assembly operably coupled to the fiber optic light conveyor.

12. The flow cytometer according to claim 1, wherein the light source comprises a laser.

13. The flow cytometer according to claim 12, wherein the light source comprises a second laser.

14. A method of analyzing a sample, the method comprising:
(a) introducing a sample into a flow cytometer comprising:
a light source for irradiating a particle passing through a flow cell at an interrogation point;
an objective lens for focusing particle-modulated light; and
a light collection module for collecting objective lens focused light, wherein the light collection module comprises:
a single fiber optic light conveyor; and
a refractive optical element positioned between the objective lens and the single fiber optic light conveyor, wherein the refractive optical element is configured to direct the objective lens focused light onto the surface of the single fiber optic light conveyor; and
(b) flow cytometrically analyzing the sample.

15. The method according to claim 14, wherein the refractive optical element is a prism.

16. The method according to claim 14, wherein the refractive optical element is a cylindrical lens.

17. The method according to claim 14, wherein the refractive optical element is separated from the flow cell by a distance ranging from 40 mm to 200 mm.

18. The method according to claim 14, wherein the refractive optical element is configured to refract the objective lens focused light such that it propagates along a single optical axis.

19. The method according to claim 14, wherein the fiber optic light conveyor possesses a diameter ranging from 0.6 mm to 1.2 mm.

20. The method according to claim 14, wherein the light source is configured to simultaneously irradiate a plurality of particles passing through the flow cell at the interrogation point.

* * * * *